United States Patent Office 3,501,432
Patented Mar. 17, 1970

3,501,432
PROCESS FOR PREPARING STABLE SURFACTANT-FREE POLYMER DISPERSION AND RESULTING PRODUCT
Howard J. Wright, John F. Bremmer, and Nitin Bhimani, Kansas City, Mo., and Robert M. Fitch, Fargo, N. Dak., assignors to Cook Paint & Varnish Company, Kansas City, Mo., a corporation of Delaware
No Drawing. Filed Feb. 3, 1967, Ser. No. 613,731
Int. Cl. C08f 1/13, 1/60
U.S. Cl. 260—29.6                                          7 Claims

ABSTRACT OF THE DISCLOSURE

A process for preparing a surfactant-free stabilized dispersion of water-insoluble polymer particles which comprises polymerizing partially water-soluble monomers in water in the presence of a free radical initiator and in the absence of any surfactant while incorporating in the growing polymer chain electrically charged and/or hydratable stabilizing groups whereby the polymer particles are stabilized in the dispersed state, at least some of the stabilizing groups being obtained from the initiator.

---

The present invention relates to stabilized surfactant-free aqueous polymer dispersions and methods of making the same. More particularly, the invention is concerned with the preparation of aqueous dispersions of polymer particles wherein the particles are stabilized against settling and coagulation even though a surfactant is not employed. In this connection, it is to be appreciated that the term "dispersion" is used herein in a generalized sense for the sake of convenience although the compositions of the invention might be more accurately described as hydrosols or aqueous polymer colloids or latices as will be hereinafter apparent.

The compositions of the invention are prepared using emulsion polymerization techniques. However, in conventional type emulsion polymerization, styrene or like monomer is polymerized in an aqueous medium in the presence of a catalyst, e.g. a free radical initiator, and a surfactant which functions to keep the resulting polymer particles in the emulsified state. It has been recognized that there are certain disadvantages in using a surfactant for emulsion polymerization. For example, the surfactant tends to reduce the moisture resistance of films or coatings made from the polymers so produced. Additionally, the operability of surfactants is generally specific to certain monomer systems thus greatly limiting flexibility of the processes involved. Despite these disadvantages, however, it has hitherto been considered necessary to use a surfactant when emulsion polymerizing in water in order to maintain the polymer in its emulsified state.

In view of the above, the principal object of the invention is to provide aqueous polymer systems which are free from surfactant and the disadvantages associated therewith. Other objects will also be apparent from the following detailed description of the invention.

The objects of the invention are realized by polymerizing one or more at least partially water-soluble monomers in water in the presence of a free radical initiator and in the absence of any surfactant to produce a polymer with one or more hydratable and/or electrically charged stabilizing groups or the equivalent. In the process, the polymerization is initiated in the water phase and the polymer chains grow until they become large enough to separate out and form particles. Stabilization against coagulation or settling of the particles takes place by means of the hydratable and/or electrically charged groups which are attached to the polymer chains as the polymerization proceeds.

The mechanism employed to obtain the desired stabilizing effect can be varied. However, according to one important aspect of the invention, at least some or all of the stabilizing effect is obtained from the free-radical initiator itself. This may be accomplished by using more than the amount of initiator needed to initiate the polymerization. By proper selection of the initiator, hydratable (or hydrophilic) radicals derived from the initiator, e.g. —OH groups, attach themselves to the ends of the polymer chains and thus stabilize the polymer particles. In lieu of this, or in addition to it, selected auxiliary monomers may be employed to introduce into the main polymer suitable hydratable or hydrophilic groups (e.g. —NH$_2$ —COOH or —OH).

Any free radical initiator which provides hydratable or electrically charged stabilizing groups may be employed to provide the combination initiating and stabilizing effects. However, it is preferred to use a persulphate, notably ammonium persulphate or an alkali metal persulphate such as potassium or sodium persulphate. These persulphates provide hydratable —OH groups which may be used to stabilize the polymer.

The amount of initiator employed can be varied and will depend on other factors, e.g. the particular initiator involved, whether or not the system includes other sources of hydratable stabilizing groups and the like. Usually, however, the amount of initiator will not go below 0.01% or exceed 1% by weight of the reaction medium.

While the persulphates or other initiator may be used as the sole source of stabilizing groups, an important additional feature of the invention contemplates using a water-soluble thiosulphate, bisulphite or sulphite, thiourea or like reducing agent with the persulphate or like initiator to provide sulphate and sulphonate stabilizing groups. It is also possible to use one or more monomers which contain hydratable groups (e.g. —NH$_2$, —COOH and the like) and are copolymerizable with the main monomer in combination with the presulphate or like initiator to provide or supplement the stabilizing effect. A particularly preferred monomer for this puropse is hydroxy propyl methacrylate, although other hydroxy alkyl methacrylates and acrylates may also be used. Acrylic acid is another useful comonomer for introducing the desired hydratable end groups. The amount of any such comonomer can be widely varied but usually will not be in excess of 30% by weight of the total monomer content.

The polymerization should include one or more ethylenically unsaturated monomers which are at least partially water-soluble (e.g. at least 0.1% soluble) such as the alkyl acrylates and methacrylates. It is not necessary that all of the monomer employed meet the indicated water solubility. In fact, as much as 95–99% of the total monomer content may be water-insoluble, e.g. styrene, provided the balance comprises a monomer with the indicated water solubility.

The polymerization will usually be carried out at a temperature in the range of 0 to 100° C. until the desired solid content is achieved (usually 2 to 8 hours). It will be recognized, however, that temperatures and times outside the ranges indicated may also be used.

The hydratable groups which may be introduced onto the polymer chain according to the invention may be anionic, cationic or nonionic. Typical anionic groups include carboxylate —COO$^-$ at moderate to high pH (e.g. pH 4–12), sulphate —SO$_4^-$, sulphonate —SO$_3^-$, phosphate —PO$_4^-$ and phosphonate —PO$_3^-$. Cationic groups are quaternary ammonium —N$^+$R$_3$, phosphonium —P$^+$R$_3$, sulphonium —S$^+$R$_2$ and oxonium $$-\underset{\underset{H}{|}}{O^+R}$$

where the R substituents represent hydrogen, alkyl or aryl. Suitable nonionic groups are the hydroxyl —OH, carboxyl —COOH (at low pH, e.g. pH 3 or below), amine —NR$_2$ where R is hydrogen, alkyl or aryl, polyoxyethylene-ol ·(CH$_2$—CH$_2$—O·)$_n$H, and amine

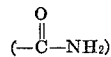

As indicated earlier, the abovementioned hydratable groups may be obtained solely or only partially from the initiator which is employed. Typically, a water-soluble persulphate, preferably an alkaline persulphate, liberates —OH groups upon heating according to the following equation:

$$2H_2O + S_2O_8^= \rightarrow 2OH \cdot + 2HSO_4^-$$

These —OH groups are attached to the ends of the polymer chains by virtue of their initiating action, and provide the desired hydratable stabilizing groups.

When the persulphate is used in combination with a sulphite or thiosulfate, stabilizing groups, e.g. sulfate and sulfonate, are obtained as follows:

$$S_2O_8^= + SO_3^= \rightarrow \cdot SO_4^- + SO_4^= + \cdot SO_3^-$$

The use of α,α'-azobisisobutyramide as initiator will liberate an amide group according to the following reaction to give a stabilizing effect:

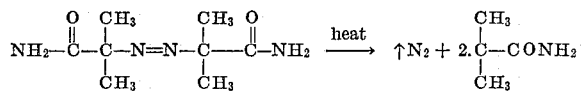

Cationic end groups may be added in the same way to obtain a stabilizing effect by using a free radical initiator which liberates cationic groups, e.g. α,α'-azobisisobutyramidine hydrochloride.

A chain transfer agent, such as thioglycolic acid or mercaptoethanol may also be used to introduce a hydratable end group on the polymer chain. Thioglycolic acid HS—CH$_2$—COOH provides the —COOH or —COO$^-$ group depending on the pH.

The desired stabilizing groups may also be introduced by copolymerization. For example, the sulphonate group —SO$_3$ may be incorporated in the polymer chain by using sodium vinyl sulphonate or sodium styrene sulphonate as comonomers (usually in amounts on the order of 1–15% by weight based on total monomer content). As noted earlier, hydroxy propyl methacrylate, hydroxy ethyl methacrylate and like hydroxy alkyl methacrylates and acrylates are preferred and introduce stabilizing —OH groups into the polymer. Hydroxy groups may also be introduced by copolymerizing with 2-hydroxyethyl vinyl sulfide or the like. Another example of a comonomer which introduces nonionic stabilizing end groups (—NH$_2$) is allyl amine. A quaternary cationic group of the formula —N$^+$R$_3$ may be introduced by copolymerizing in the presence of a copolymerizable quaternary ammonium salt, such as β-methacryloxyethyl trimethyl ammonium chloride.

The polymer may also be stabilized by chemical modification to convert the surface groups of polymer particles to hydratable or charged groups. For example, polymethyl acrylate can be modified by the introduction of anionic groups by hydrolysis, while polyvinyl acetate may be converted in part to polyvinyl alcohol by mild treatment in the presence of an acid or base.

The products of the invention are highly stable in the sence that they do not coagulate or settle out even on long standing. Additionaly, they are mechanically stable so that coagulation and settling do not occur on exposure to the action of a Waring Blendor or the like. Furthermore, the aqueous dispersions of the invention can be made into films of greater water resistance than corresponding products made in the presence of a surfactant. The aqueous dispersions can be converted into organic solvent compositions, with or without melamine-formaldehyde condensates, to advantage over corresponding products made by prior techniques.

One particularly advantageous area of use for the present products is in electrocoating. Prior electrocoating procedures suffer from surfactant buildup and other problems incident to the use of surfactants. Elimination of the surfactant reduces the electrolytic conductivity. This is desirable for electrocoating processes. For example, the present products give less gas formation as a result of water electrolysis because of their lower conductivity. Other advantages of the present products are noted elsewhere herein.

The invention is illustrated but not limited by the following examples wherein parts and percentages are by weight.

EXAMPLE 1

This example illustrates the preparation of a surfactant-free dispersion wherein stabilization is obtained by the introduction of hydratable anionic end groups as well as copolymerized carboxyl and hydroxyl groups on the polymer.

The following components were employed:

|  | Percent |
|---|---|
| Water | 64.70 |
| Acrylic acid | 0.75 |
| Styrene | 16.95 |
| Ethyl acrylate | 3.50 |
| 2-ethyl hexyl acrylate | 8.75 |
| Hydroxypropylmethacrylate | 5.25 |
| (NH$_4$)$_2$S$_2$O$_8$ | 0.10 |
|  | 100.00 |

Part of the water was put into a flask and heated to reflux under nitrogen. The persulphate catalyst was dissolved in the rest of the water. The monomers were mixed together and while refluxing continuously, the monomer mixture and catalyst were added as separate streams to the flask over a four hour period. The reaction mixture was then cooled to room temperature to give a stable polymer dispersion that did not settle or coagulate on standing for a long period of time or when subjected to the action of a Waring Blendor. The product was effectively used for coating into thin films of good water resistance.

The water was removed from the dispersion and the dried polymer was then dissolved in xylol after which a butylated melamine-formaldehyde resin was added to give a coating composition useful as an automotive finish.

In this example, the acrylic acid, the hydroxypropyl methacrylate and persulphate both served to supply the desired hydratable stabilizing groups. If desired, the amount of persulphate content in the above example could be reduced to about 0.05% while obtaining essentially similar results.

EXAMPLE 2

Example 1 was repeated except that the hydroxypropyl methacrylate was omitted and the amount of persulphate was increased to about 2% based on the total amount of monomers used, the persulphate functioning not only as the initiator but also as a sole source of supply of hydratable stabilizing groups. Essentially equivalent results were obtained. By gradually reducing the amount of persulphate employed in the above sytem, it was found that when the hydroxypropyl methacrylate is omitted, it is necessary to use at least about 1.2% by weight of the initiator on the basis of the total monomers employed in order to obtain the desired dispersion stability.

EXAMPLE 3

This example illustrates the combined use of hydroxypropyl methacrylate, persulphate and sulphite to provide the desired hydratable stabilizing groups.

The process of Example 1 was repeated using the following formula:

| | Percent |
|---|---|
| Water | 46.9 |
| Acrylic acid | 5.0 |
| Styrene | 21.5 |
| Ethyl acrylate | 5.0 |
| 2-ethylhexyl acrylate | 12.10 |
| Hydroxypropyl methacrylate | 8.0 |
| Na$_2$SO$_3$ (50% in water) | 0.30 |
| K$_2$S$_2$O$_8$ (5% in water) | 1.20 |
| | 100.00 |

A stabilized dispersion was obtained with the properties and usefulness of the dispersion of Example 1.

In this particular example, the hydroxypropyl methacrylate and acrylic acid supplemented the stabilizing effect of the initiator by copolymerizing with the styrene to introduce hydratable or hydrophilic groups into the polymer.

EXAMPLE 4

Example 1 was repeated using the following formula:

| | Percent |
|---|---|
| Water | 64.20 |
| Acrylic acid | 3.50 |
| Styrene | 15.20 |
| Hydroxypropyl methacrylate | 5.25 |
| Ethyl acrylate | 3.50 |
| 2-ethylhexyl acrylate | 6.00 |
| Ethylene glycol dimethacrylate | 1.75 |
| (NH$_4$)$_2$S$_2$O$_8$ | 0.6 |
| | 100.00 |

This formulation gave an aqueous polymer dispersion which was stable on standing. The solid polymer, after removal of the water, was exceptionally useful in an organosol alone or when used with melamine-formaldehyde resins.

EXAMPLE 5

Example 4 was repeated using divinylbenzene in lieu of the ethylene glycol dimethacrylate with equivalent results.

EXAMPLE 6

Example 1 was repeated using the following formula:

| | Percent |
|---|---|
| Water | 64.40 |
| Methyl methacrylate | 33.20 |
| 2-ethylhexyl acrylate | 1.80 |
| (NH$_4$)$_2$S$_2$O$_8$ | .60 |
| | 100.00 |

A stable polymer dispersion suitable for coating purposes was obtained. In this particular instance, the entire stabilizing effect was obtained through the radicals liberated by the use of excess persulphate.

EXAMPLE 7

Example 6 was repeated using butyl acrylate for the 2-ethylhexyl acrylate with essentially equivalent results.

EXAMPLE 8

Examples 6 and 7 were repeated except that a small amount of acrylic acid (3.5%) was included. It was found that this made it possible to reduce the amount of persulphate to 0.20% without affecting the stability of the resulting products. This shows that the acrylic acid and persulphate both demonstate an effect on stability.

EXAMPLE 9

Example 1 was repeated using the following formula:

| | Percent |
|---|---|
| (NH$_4$)$_2$S$_2$O$_8$ | 0.8 |
| Water | 39.2 |
| Styrene | 29.4 |
| Butyl acrylate | 29.4 |
| Acrylic acid | 1.2 |
| | 100.0 |

A highly useful stabilized dispersion of 60% solids content was obtained. The stability was surprisingly good in view of the high solids content.

EXAMPLE 10

This example is illustrative of the preparation of a polymer dispersion stabilized by the introduction of cationic end groups on the polymer.

The following formula was employed:

| | Percent |
|---|---|
| 2,2′ azobisisobutyramidine hydrochloride | 0.6 |
| Deionized water | 48.4 |
| Methacryloxyethyl trimethyl ammonium chloride (50% aqueous) | 2.0 |
| Styrene | 13.0 |
| Butyl acrylate | 36.0 |
| | 100.0 |

Half of the water along with one-half of the azo catalyst was charged to the reaction flask. The balance of the catalyst was dissolved in one-fourth of the water to be added simultaneously with the monomer addition. The cationic quarternary ammonium salt monomer was diluted with the final fourth of the water and added separately but simultaneously with the catalyst solution and the blend of the two remaining monomers continuously and uniformly, over a four hour period. During this period the reaction flask was maintained at 80° C. by means of a water bath. The resulting polymer disperson was stable and suitable for use directly in coating or after formulation into organic solvent composition as in Example 1.

It will be recognized that various modifications may be made in the invention as described above. Hence the scope of the invention is defined in the following claims wherein.

What is claimed is:

1. A process for preparing a surfactant-free stabilized aqueous dispersion of water-insoluble polymer particles which comprises polymerizing at a temperature of from 80° C. up to reflux and at atmospheric pressure, a mixture of monoethylenically unsaturated monomers consisting essentially of at least one monomer selected from the group consisting of alkyl acrylates and alkyl methacrylates and a monomer selected from the group consisting of hydroxy alkyl acrylate, hydroxy alkyl methacrylate, acrylic acid and methacrylic acid, in a polymerization medium consisting essentially of water and a persulfate free radical initiator; and in the absence of any surfactant, while incorporating in the growing polymer chain—OH stabilizing groups whereby the polymer particles are stabilized in the dispersed state, at least some of the —OH stabilizing groups being obtained from the initiator.

2. The process of claim 1 wherein all of the OH stabilizing groups are obtained solely from the initiator.

3. The process of claim 1 wherein a reducing agent is used with the initiator to provide said stabilizing groups.

4. The process of claim 3 wherein said reducing agent is a water-soluble thiosulphate, bisulphite, sulphite or thiourea and said initiator is a persulfate.

5. The process of claim 1 wherein a chain transfer agent is used to introduce hydratable stabilizing groups on the polymer chain.

6. The process of claim 5 wherein said chain transfer agent is thioglycolic acid.

7. The stabilized dispersion obtained by the process of claim 1.

References Cited

UNITED STATES PATENTS

| 2,941,971 | 6/1960 | Thompson et al. |
| 3,297,618 | 1/1967 | Glabisch et al. |
| 3,308,081 | 3/1967 | Glabisch. |
| 2,300,920 | 11/1942 | Heuer. |
| 3,219,608 | 11/1965 | Ingleby et al. |
| 3,265,654 | 8/1966 | Glabisch et al. |

SAMUEL H. BLECH, Primary Examiner

W. S. BRIGGS, SR., Assistant Examiner

U.S. Cl. X.R.

204—56; 260—33.4, 79.3, 79.5, 80.8, 80.75, 80.81, 85.1, 86.1